United States Patent
Aihara et al.

(10) Patent No.: US 7,053,502 B2
(45) Date of Patent: May 30, 2006

(54) POWER SUPPLY WITH UNINTERRUPTIBLE FUNCTION

(75) Inventors: Nobuyuki Aihara, Hiratsuka (JP); Takeshi Onaka, Hitachi (JP); Norikazu Tokunaga, Hitachi (JP); Kenichi Onda, Hitachi (JP); Satoru Masuyama, Odawara (JP); Shigekazu Zemba, Fujisawa (JP)

(73) Assignees: Hitachi, Ltd., Tokyo (JP); Hitachi Computer Peripherals Co., Ltd., Odawara (JP)

( * ) Notice: Subject to any disclaimer, the term of this patent is extended or adjusted under 35 U.S.C. 154(b) by 0 days.

(21) Appl. No.: 10/809,863

(22) Filed: Mar. 26, 2004

(65) Prior Publication Data

US 2005/0078494 A1    Apr. 14, 2005

Related U.S. Application Data

(63) Continuation of application No. 09/469,619, filed on Dec. 22, 1999, now Pat. No. 6,795,322.

(30) Foreign Application Priority Data

Dec. 25, 1998  (JP) ............................. 10-368948

(51) Int. Cl.
  *H02J 1/12* (2006.01)
(52) U.S. Cl. .......................................... 307/46; 307/66
(58) Field of Classification Search .................. 363/34, 363/37, 39; 307/44–46, 48, 64, 66, 80
  See application file for complete search history.

(56) References Cited

U.S. PATENT DOCUMENTS

| | | | |
|---|---|---|---|
| 4,709,318 A | 11/1987 | Gephart et al. | |
| 5,347,164 A | 9/1994 | Yeh | |
| 5,612,581 A | 3/1997 | Kageyama | |
| 5,631,814 A | 5/1997 | Zak | |
| 5,691,629 A | 11/1997 | Belnap | |
| 5,737,202 A | 4/1998 | Shimamori | |
| 5,737,204 A | 4/1998 | Brown | |
| 5,754,414 A * | 5/1998 | Hanington | 363/21.12 |
| 5,768,117 A | 6/1998 | Takahashi et al. | |
| 5,886,880 A | 3/1999 | Hisanaga | |
| 5,901,057 A | 5/1999 | Brand et al. | |
| 5,978,236 A | 11/1999 | Faberman et al. | |
| 5,982,645 A | 11/1999 | Levran et al. | |
| 6,057,609 A | 5/2000 | Nagai et al. | |
| 6,115,276 A | 9/2000 | Mao | |
| 6,288,918 B1 * | 9/2001 | Tarodo et al. | 363/44 |
| 6,795,322 B1 * | 9/2004 | Aihara et al. | 363/37 |

FOREIGN PATENT DOCUMENTS

| | | |
|---|---|---|
| JP | A-2-193544 | 7/1990 |
| JP | A-4-265641 | 9/1992 |

(Continued)

*Primary Examiner*—Gary L Laxton
(74) *Attorney, Agent, or Firm*—Antonelli, Terry, Stout and Kraus, LLP.

(57) ABSTRACT

A power supply provided with: an AC/DC converter which receives AC power, converts the AC power into DC power, and outputs the DC power; a DC/DC converter which receives the DC power from the AC/DC converter, and controls a level of an output voltage of the DC/DC converter to be equal to a level of a voltage to be used by a load while the DC/DC converter supplies the output voltage to the load; a DC converter which is connected to an input of the DC/DC converter; and a DC power storage means which supplies electric power to the DC/DC converter through the DC converter.

10 Claims, 6 Drawing Sheets

FOREIGN PATENT DOCUMENTS

| | | |
|---|---|---|
| JP | A-4-304160 | 10/1992 |
| JP | A-7-194118 | 7/1995 |
| JP | A-9-200974 | 7/1997 |
| JP | A-9-322433 | 12/1997 |
| JP | A-10-262347 | 9/1998 |
| JP | A-10-336918 | 12/1998 |

* cited by examiner ns

POWER SUPPLY WITH UNINTERRUPTIBLE FUNCTION

CROSS-REFERENCE TO RELATED APPLICATIONS

This application is a continuation of application Ser. No. 09/469,619 filed on Dec. 22, 1999 now U.S. Pat. No. 6,795,322. The contents of application Ser. No. 09/469,619 are hereby incorporated herein by reference in their entirety.

BACKGROUND OF THE INVENTION

The present invention relates to a power supply for converting an AC input into DC power so as to supply the DC power to a load, and particularly relates to such a power supply having an uninterruptible function.

A communication/information appliance such as a disk array apparatus receives a commercial AC input, makes an AC/DC converter convert the AC input into a desired DC voltage required by a load in the appliance, and supplies the DC voltage to the load. In order to improve reliability of a power supply in the appliance, AC/DC converters are put in parallel redundant operation. Further, in order to improve reliability on the commercial AC, the inputs to the AC/DC converters are obtained from two AC systems. Further, in order to achieve high reliability on the commercial AC input, a power supply configuration provided with an uninterruptible power supply (hereinafter referred to as UPS) at the outside is used. A main circuit of the UPS connected is composed of an AC/DC converter, a battery, an inverter, and a change-over switch. Normally, the battery is charged while DC power is supplied to the inverter by the AC/DC converter, so that the DC power is converted into stable AC power by the inverter and the stable AC power is supplied to the communication/information appliance. When the AC input is interrupted, the DC power of the battery is converted into AC power by the inverter so that the AC power is supplied to the communication/information appliance. When a failure occurs in the inside of the UPS, power supply is changed to a bypass so that an AC input is supplied to the communication/information appliance directly. Incidentally, as a specific example of the aforementioned background art, there is a power supply described in JP-A-7-194118.

In the background-art power supply configuration, in a normal operation mode, there are two stages of power conversion in the inside of the UPS and a converter for converting AC power into DC power directly in the communication/information appliance side. That is, three stages of power conversion are required. Accordingly, conversion efficiency is worsened. Moreover, because the background-art power supply configuration is made so that a plurality of stages of converters having overlapping functions are connected, the volume of the power supply is large and the cost thereof is high. Further, with the advance of diversification of communication/information appliances, the power supply is, in most cases, formed to correspond to a wide-range input so that any appliance can be selected on the user side without awareness of an input voltage. When an external UPS is connected, there is, however, a problem that the UPS of an input voltage specification adapted to the user environment must be selected because the input/output voltage specification of the UPS is fixed.

SUMMARY OF THE INVENTION

The present invention is a result of a trial in consideration of solving the aforementioned problems. A power supply according to the present invention comprises: an AC/DC converter by which AC power received as an input is converted into DC power as an output; a DC/DC converter by which the level of an output voltage of the DC/DC converter is controlled to be equal to the level of a voltage to be used by the load while the DC power received as an input is supplied to a load; a DC converter connected to the input of the DC/DC converter; and a DC power storage means for supplying electric power to the DC/DC converter through the DC converter.

According to the present invention, a high-reliable DC power supply having an uninterruptible function can be achieved.

Preferably, the DC converter is configured so that the output voltage of the DC converter is controlled to be boosted over the voltage of the DC power storage means while electric power supplied from the DC power storage means is supplied to the input of the DC/DC converter. Such a preferable configuration of the DC converter is provided with: a first converter having an AC terminal, and a DC terminal connected to the input of the DC/DC converter; a transformer having a high-voltage side winding connected to the AC terminal of the first converter, and a low-voltage side winding; and a second converter having an AC terminal connected to the low-voltage side winding of the transformer, and a DC terminal connected to the DC power storage means. According to this configuration, both charge and discharge of the DC power storage means can be performed even in the case where the level of the voltage of the DC power storage means is different from the level of the output voltage of the AC/DC converter, that is, the level of the input voltage of the DC/DC converter.

DETAILED DESCRIPTION OF THE INVENTION

Figure 1:
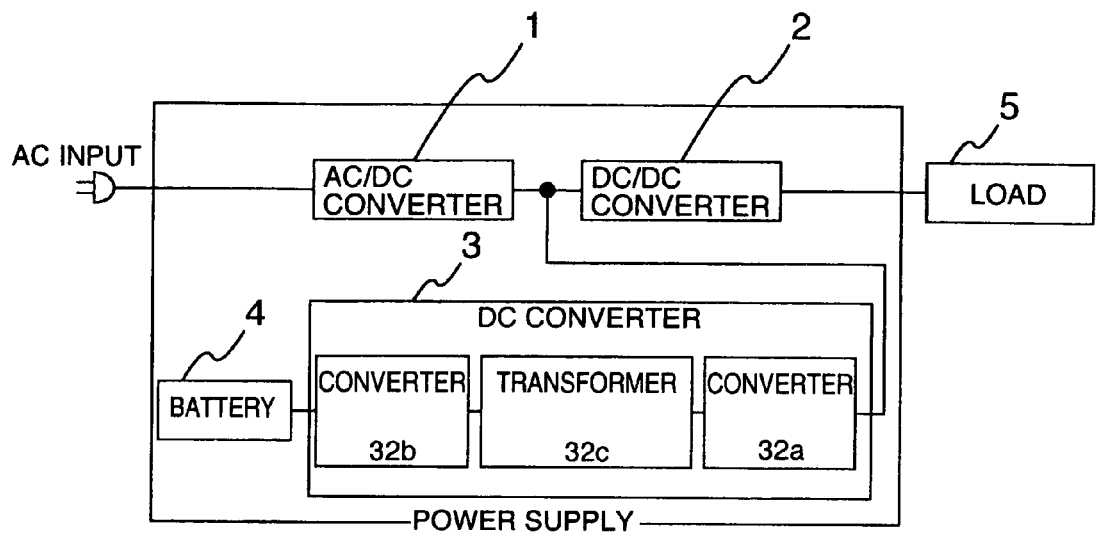
FIG. 1 shows a first embodiment of the present invention.
Figure 9:
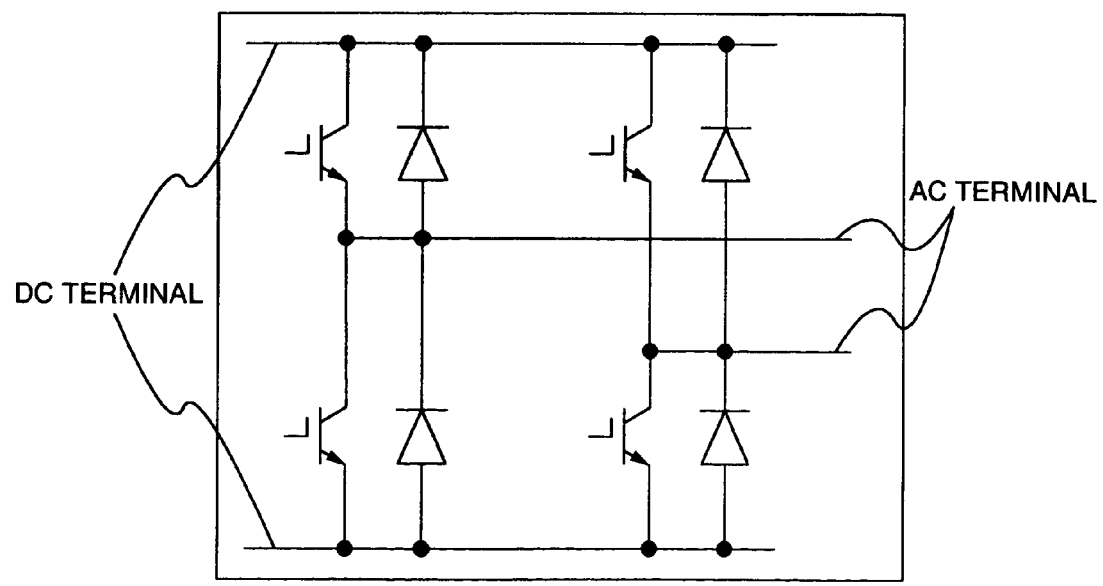
FIG. 9 shows an example of a bridge type converter.
Figure 10:
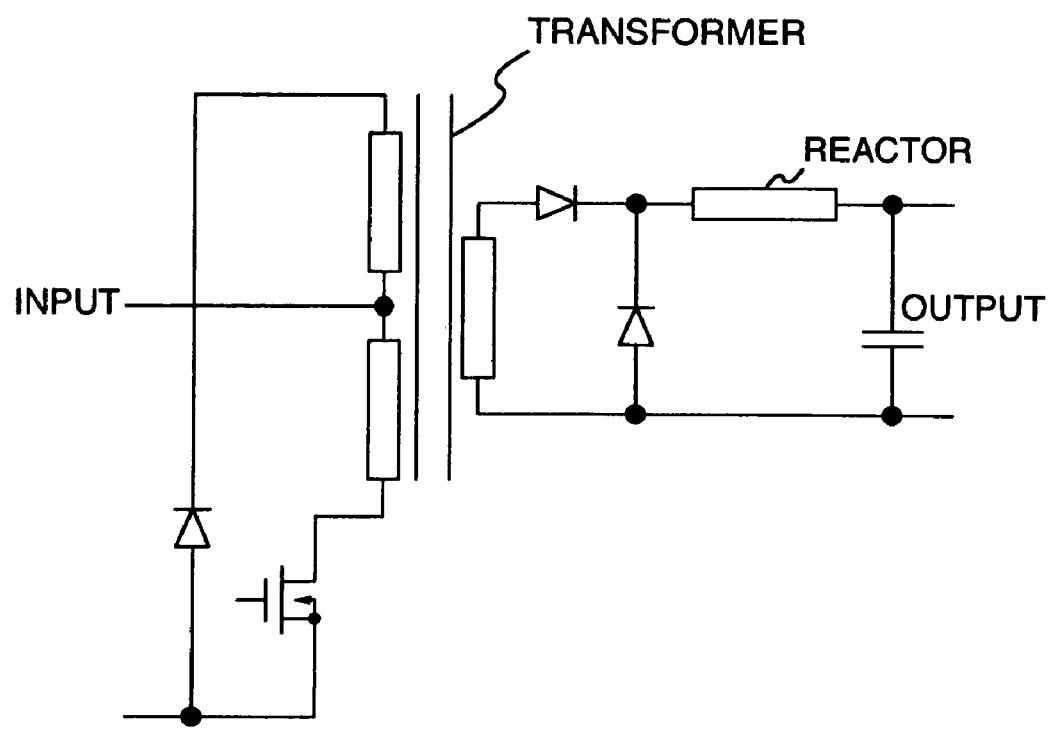
FIG. 10 shows an example of a 1-transistor forward converter.

FIG. 1 shows a power supply according to a first embodiment of the present invention. The power supply is provided with an AC/DC converter 1 for converting supplied AC power into DC power; a battery 4; a DC converter 3 for converting DC power of the battery 4 into a DC voltage of a level substantially equal to the level of the DC output voltage of the AC/DC converter 1; and a DC/DC converter 2 for converting the DC output power of the AC/DC converter 1 or of the DC converter 3 into a DC voltage required by a load 5. A diode bridge rectifier circuit, or a bridge converter and phase rectifier circuit having a semiconductor switching device as shown in FIG. 9, or the like, can be used as the AC/DC converter 1. A 1-transistor forward converter shown in FIG. 10, or the like, can be used as the DC/DC converter 2. When the configuration is made so that DC power is supplied to the DC/DC converter 2 from the AC/DC converter 1 and the DC converter 3, stable power can be supplied to the load 5 from the DC/DC converter 2 even in case of an accident of the AC input. Incidentally, a main circuit of the DC converter 3 is constituted by a converter 32*a*, a transformer 32*c*, and a converter 32*b* in order to boost the relatively low DC voltage (for example, about 40 V to about 50 V) of the battery 4 to the level (for example, about 300 V to about 400 V) of the DC output voltage of the AC/DC converter 1 which is higher than the level of the DC voltage of the battery 4, or in order to improve the separation and utilization factor of earth potential. That is, the DC converter 3 is configured so that the battery 4 is connected to a DC terminal of the converter 32*b* whereas a low-voltage side winding of the transformer 32*c* is connected to an AC terminal of the converter 32*b*. Further, a high-voltage side winding of the transformer 32*c* is connected to an AC terminal of the converter 32*a* whereas a DC terminal of the converter 32*a* is connected both to the DC output of the AC/DC converter 1 and to the DC input of the DC/DC converter 2. A bridge converter as shown in FIG. 9, or the like, can be used as each of the converters 32*a* and 32*b*.

In a normal mode, the AC/DC converter 1 is supplied with commercial AC power of 100 V or 200 V as an input and converts the input AC power into DC power as an output. The DC output voltage from the AC/DC converter 1 is higher (for example, 300 V to 400 V) than the effective value of the AC input voltage. The DC output power from the AC/DC converter 1 is supplied as an input to the DC/DC converter 2. The DC/DC converter 2 controls the level of its DC output voltage to be equal to the level of a voltage to be required by the load 5 while the DC/DC converter 2 supplies the given DC power to the load 5. The DC output power of the AC/DC converter 1 is supplied to the DC terminal of the converter 32*a*. The converter 32*a* operates as a DC/AC converter, that is, as an inverter, so as to convert the input DC power into AC power on the basis of the ON/OFF operation of a semiconductor switching device to thereby supply the AC power to the high-voltage side winding of the transformer 32*c*. The transformer 32*c* drops the AC input voltage applied to its high-voltage side winding and outputs the dropped AC voltage at its low-voltage side winding. The AC output power at the low-voltage side winding is supplied to the AC terminal of the converter 32*b*. The converter 32*b* operates as an AC/DC converter so as to convert the input AC power into DC power on the basis of the ON/OFF operation of a diode rectifier and semiconductor switching device to thereby supply the DC power from its DC terminal of the converter 32*b*. The DC output power from converter 32*b* is stored in the battery 4 so that the battery 4 is charged. That is, the DC converter 3 is supplied with the DC power of the AC/DC converter 1 as its input and controls its output voltage to be lower than the output side voltage of the AC/DC converter 1 while it outputs the DC power as its output. Thus, the battery 4 is charged with the DC output power of the DC converter 3 so that DC power is stored in the battery 4.

On the contrary, in case where the AC/DC converter 1 cannot supply power at all or enough to be consumed by the load because of power interruption, or the like, the battery 4 supplies DC power to the DC terminal of the converter 32*b*. The converter 32*b* operates as a DC/AC converter, that is, as an inverter, so as to convert the DC input power into AC power on the basis of the ON/OFF operation of the semiconductor switching device and supplies the AC power to the low-voltage side winding of the transformer 32*c*. The transformer 32*c* the AC power at its high-voltage side winding with boosting the AC voltage supplied to its low-voltage side winding. The AC output power at the high-voltage side winding is supplied to the AC terminal of the converter 32*a*. The converter 32*a* operates as an AC/DC converter so as to convert the AC input power into DC power on the basis of the ON/OFF operation of the diode rectifier and semiconductor switching device and outputs the DC power from its DC terminal. The DC/DC converter 2 is supplied with the DC output power of the converter 32*a* as its input and controls the level of its DC output voltage to be equal to the level of the voltage to be used by the load 5 while it supplies the supplied DC power to the load 5. That is, the DC converter 3 makes a control to boost its DC output voltage to be over the DC voltage of the battery 4 while it supplies DC power discharged from the battery 4 to the input of the DC/DC converter 2.

As described above, an uninterruptible DC power supply system in which the DC input voltage of the DC/DC converter 2 is backed up by the DC converter 3 can be provided according to the embodiment of FIG. 1. Hence, reliability can be improved. Moreover, the system can be prevented from having power conversion portions with overlapping functions. Hence, reduction in size and cost and improvement in conversion efficiency can be achieved. Moreover, the DC converter 3 is provided with the converters 32*a* and 32*b* having semiconductor switching devices respectively, and the transformer 32*c*. Hence, even in the case where the level of the voltage of the battery 4 is greatly different from the level of the output voltage of the AC/DC converter 1, that is, from the level of the input voltage of the DC/DC converter 2, both charge and discharge of the battery 4 can be carried out, and voltage, level conversion can be made between the voltage level of the battery 4 and the output voltage level of the AC/DC converter 1 with low power loss. Hence, according to the embodiment, a power supply of high reliability and low loss can be achieved. Incidentally, the battery 4 in this embodiment may be replaced by any other DC power storage means such as a secondary battery, a capacitor, an electric double layer, or the like.

Figure 2:
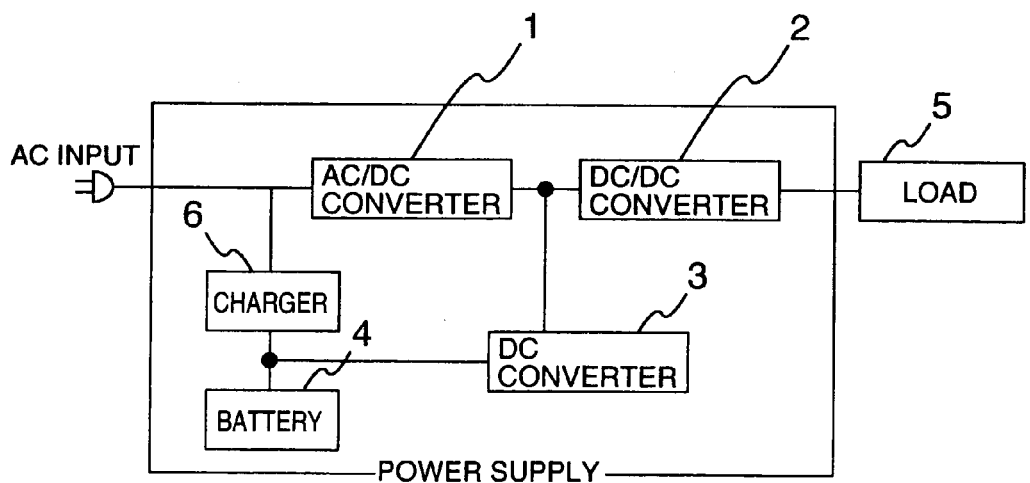
FIG. 2 shows a second embodiment of the present invention.

FIG. 2 shows a power supply according to a second embodiment of the present invention. The point of difference of this embodiment from the embodiment of FIG. 1 is that the power supply according to this embodiment is further provided with a charger 6 connected to an AC input so as to convert AC power supplied from the AC input into DC power so that the battery 4 is charged with the DC power obtained from the AC input by the charger 6. With this configuration, the function of charging the battery 4 through the DC converter 3 is not required. Hence, the DC converter 3 does not operate in a normal mode but operates in a power interruption mode in the same manner as in the embodiment of FIG. 1. According to the embodiment of FIG. 2, the DC converter 3 can be provided to have a single function of unidirectional power conversion. Hence, reliability can be improved more greatly, and reduction in size and cost and improvement in conversion efficiency can be achieved. Incidentally, a circuit shown in FIG. 9, a diode bridge rectifier, or the like, can be used as the charger 6. Moreover, because the battery charging function of the DC converter 3 is not required, the converter 32a may be constituted by a simple diode rectifier so that the circuit configuration of the converter 32a is simplified.

Figure 3:
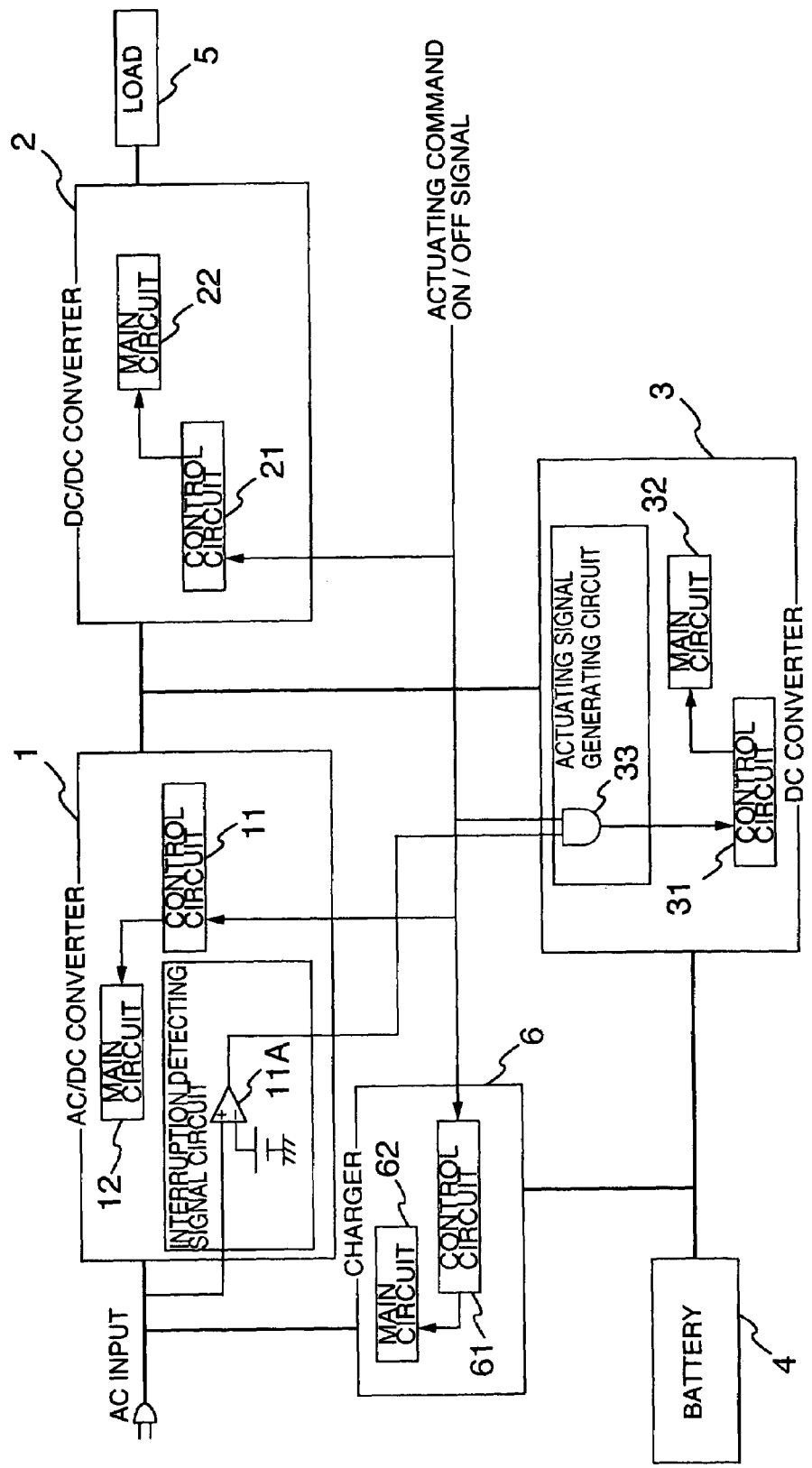
FIG. 3 shows a detailed configuration of the second embodiment of the present invention.

FIG. 3 shows a more detailed configuration of the embodiment of FIG. 2. The AC/DC converter 1 is constituted by a control circuit 11, a power interruption detection signal circuit 11a, and a main circuit 12 having a power-factor improvement function. The AC/DC converter 1 receives a commercial AC input and outputs DC power. It is a matter of course that the control circuit 11 controls the output voltage of the AC/DC converter 1 to be equal to a predetermined DC voltage on the basis of the ON/OFF actuation of a semiconductor switching device of the main circuit 12 such as a circuit of FIG. 9 according to an ON/OFF signal which serves as an actuating command. Further, the control circuit 11 has a power-factor improvement function and hence performs controlling to suppress harmonic current in the AC input. The power interruption detection signal circuit 11a has a function of monitoring the AC input and detecting an accident, or the like. When power interruption is detected, the power interruption detection signal circuit 11a generates a power interruption detection signal and applies the signal to the DC converter 3. That is, the power interruption detection circuit 11a compares the voltage level of the AC input with a reference voltage level and sends a power interruption detection signal to the DC converter 3 when the voltage level of the AC input is lower than the reference voltage level. The DC/DC converter 2 includes a control circuit 21, and a main circuit 22. The control circuit 21 drives a semiconductor switching device of the main circuit 22 (for example, a circuit of FIG. 10) to switch ON/OFF according to an ON/OFF signal which serves as an actuating command. The main circuit 22 is supplied with DC power from the AC/DC converter 1 or from the DC converter 3, converts the supplied DC power into DC power required by the load 5, and then supplies the converted DC power to the load 5. The DC converter 3 is constituted by a control circuit 31, a main circuit 32, and an actuating signal generating circuit 33. The actuating signal generating circuit 33 is supplied with a power interruption detection signal and an actuating command. When a power interruption detection signal is received from the power interruption detection circuit 11a, the actuating signal generating circuit 33 sends an input actuating command to the control circuit 31. In a normal mode in which no power interruption detection signal is supplied, the actuating signal generating circuit 33 does not send out the actuating command. In this embodiment, an AND circuit is used in the actuating signal generating circuit 33. In a power interruption mode, the level of the power interruption detection signal input to the AND circuit is high (1). In this mode, when the actuating command is ON (that is, the level of the actuating command is high (1)), the level of the output of the AND circuit is high (1), that is, the output of the AND circuit is ON. In this mode, on the other hand, when the actuating command is OFF (that is, the level of the actuating command is low (0)), the level of the output of the AND circuit is low (0), that is, the output of the AND circuit is OFF. That is, the output of the actuating signal generating circuit 33 is an ON/OFF signal similar to the ON/OFF signal as the actuating command. On the other hand, in a normal mode, the level of the power interruption detection signal is low (0). In this mode, therefore, the level of the output of the AND circuit is low (0) irrespective of the ON/OFF signal as the actuating command. Hence, no signal corresponding to the actuating command signal is produced from the AND circuit. When a power interruption detection signal is applied in case where the AC input is interrupted, the control circuit 31 is supplied with the ON/OFF signal from the actuating signal generating circuit 33 and drives the semiconductor switching device of the main circuit 32 to switch ON/OFF. Hence, the main circuit 32 operates to convert the DC power of the battery 4 into a DC voltage substantially equal to the output voltage of the AC/DC converter 1 and supply the DC voltage to the DC/DC converter 2. The charger 6 is constituted by a control circuit 61, and a main circuit 62. The control circuit 61 is supplied with the ON/OFF signal as the actuating command and drives a semiconductor switching device of the main circuit 62 to switch ON/OFF. Hence, the main circuit 62 converts the AC input into DC power so as to charge the battery 4 with a voltage or current in accordance with the battery charging state. According to the power supply of FIG. 3, an uninterruptible DC power supply system in which the DC input voltage of the DC/DC converter 2 is backed up by the DC converter 3 can be provided. Hence, reliability can be improved. Moreover, the system does not have any power conversion portions having overlapping functions. Hence, it is possible to achieve a power supply in which reduction in size and cost and improvement in conversion efficiency can be attained.

Figure 4:
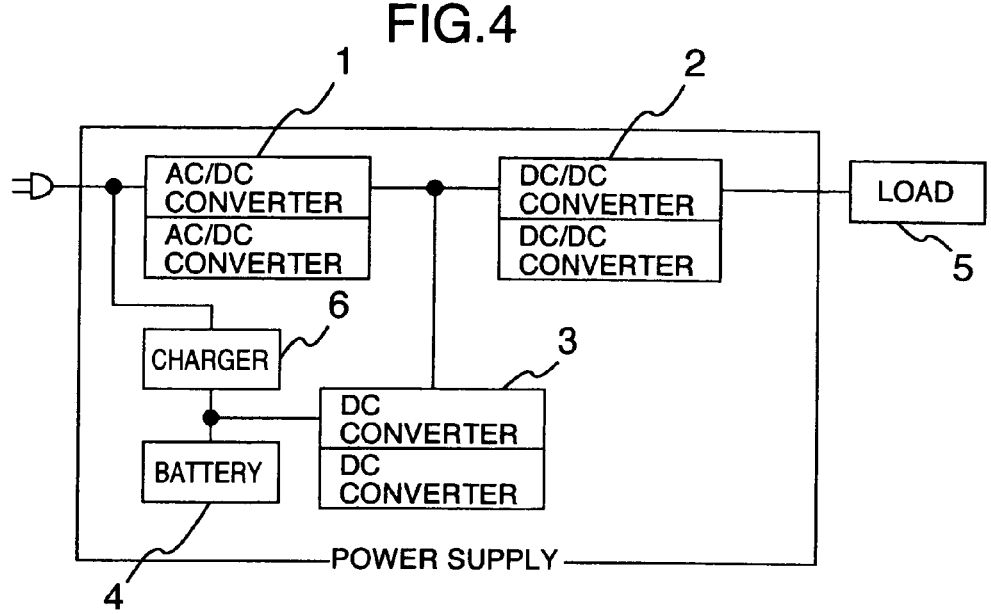
FIG. 4 shows a third embodiment of the present invention.

FIG. 4 shows a power supply according to a third embodiment of the present invention. In FIG. 4, circuit constituent parts such as converters, or the like, designated by the same reference numerals used in FIG. 3 designate the same circuit constituent parts as described in the embodiment shown in FIGS. 2 and 3. In the embodiment of FIG. 4, the AC/DC converter 1 is constituted by a plurality of unit AC/DC converters connected in parallel with one another, the DC/DC converter 2 is constituted by a plurality of unit DC/DC converters connected in parallel with one another and the DC converter 3 is constituted by a plurality of unit DC converters connected in parallel with one another. Each of the unit AC/DC converters, the unit DC/DC converters and the unit DC converters is constituted by a module unit or a semiconductor integrated circuit which is built in one casing or mounted on one circuit board. The number of the unit AC/DC converters connected in parallel with one another, the number of the unit DC/DC converters connected in parallel with one another and the number of the unit DC converters connected in parallel with one another are selected in accordance with the load capacity and the purpose of use. The circuit operations thereof are the same as in the embodiment of FIG. 3. Further, each of circuit constituent parts of the unit DC converters is constituted by a module unit and the number of the unit DC converters connected in parallel with one another is selected in accordance with the load capacity and the purpose of use. In the configuration in which circuit constituent parts are arranged in parallel with one other so as to be multiplexed as shown in FIG. 4, electric power can be supplied to the load 5 securely even in case where any unit circuit constituent part breaks down. Moreover, for maintenance and exchange of the unit circuit constituent parts, any unit circuit constituent part can be exchanged to a new one without stopping the power supply. According to the embodiment of FIG. 4, an interruptible DC power supply in which the DC input voltage of the DC/DC converter 2 is backed up by the DC converter 3 can be provided. Moreover, reliability is improved more greatly because the circuit constituent parts are multiplexed. Moreover, a power supply of easily variable power capacity can be achieved because the number of the circuit constituent parts connected in parallel with one another can be selected in accordance with the required capacity and the purpose of use.

Figure 5:
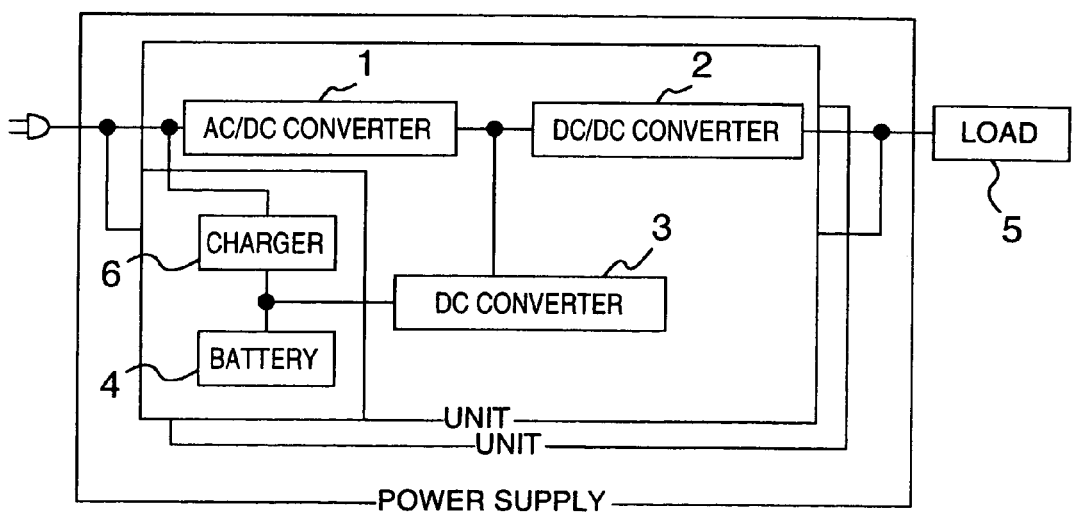
FIG. 5 shows a fourth embodiment of the present invention.

FIG. 5 shows a power supply according to a fourth embodiment of the present invention. This embodiment shows a power supply configuration in which a plurality of power supply units each formed in such a manner as described in the embodiment shown in FIGS. 2 and 3 are arranged in parallel with one another so as to be multiplexed. Incidentally, the DC/DC converters 2 have a function of permitting parallel operation. In the multiplex configuration as shown in FIG. 5, electric power can be supplied to the load 5 securely even in case where any one of the power supply units breaks down. Moreover, for maintenance and exchange of the power supply units, any power supply unit can be exchanged to a new one without stopping the power supply. Moreover, because each power supply unit has a charger and a battery, power supply to the load can be continued even in case where a part of the chargers or a part of the batteries breaks down. Hence, reliability against a failure in chargers and batteries is improved. Moreover, a charger 6 and a battery 4 may be used in common to all the power supply units so that DC power from one battery can be supplied in common to the respective DC converters 3 of the power supply units.

Figure 6:
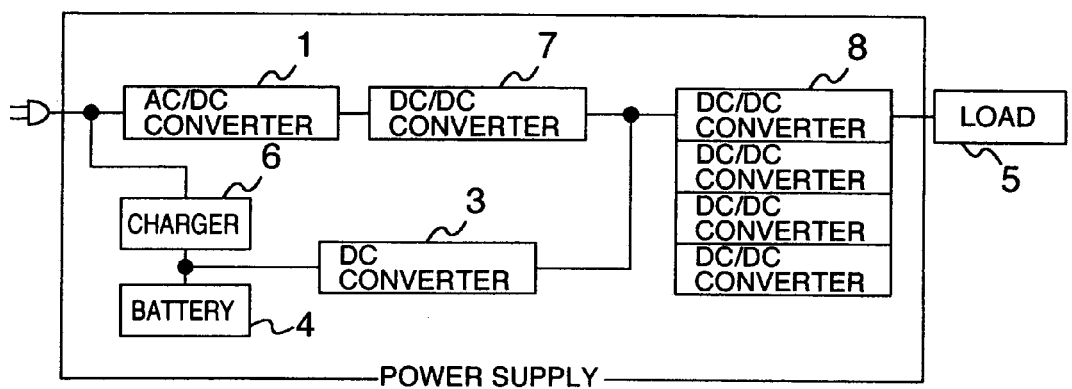
FIG. 6 shows a fifth embodiment of the present invention.

FIG. 6 shows a power supply according to a fifth embodiment of the present invention. In FIG. 6, circuit constituent parts such as converters, or the like, designated by the same reference numerals as shown in FIG. 3 designate the same circuit constituent parts as described in the embodiment shown in FIGS. 2 and 3. The point of difference of the embodiment shown in FIG. 6 from the embodiment shown in FIGS. 2 and 3 is that a DC input of a DC/DC converter 7 is connected to the DC output of the AC/DC converter 1 and a DC input of a DC/DC converter 8 is connected to a DC output of the DC/DC converter 7. The DC/DC converter 8 is constituted by a plurality of unit DC/DC converters connected in parallel with one another so as to be multiplexed. The unit DC/DC converters have a common DC input, and a common DC output. The common output of the unit DC/DC converters is connected to the load. The common input of the unit DC/DC converters is connected to the output of the DC/DC converter 7. Further, the DC terminal of the DC converter 3 is connected both to the DC output of the DC/DC converter 7 and to the common DC input of the DC/DC converter 8.

In FIG. 6, the AC/DC converter 1 is supplied with AC power from the AC input and controls the output voltage level of the AC/DC converter 1 to be a first DC voltage level while it converts the AC power into DC power. The DC power is supplied to the DC/DC converter 7. The DC/DC converter 7 controls the DC output voltage level of the DC/DC converter 7 to be a second DC voltage level which is lower than the first DC voltage level while it outputs and supplies the input first DC power to the DC/DC converter 8. The DC converter 3 controls the output voltage level of the DC converter 3 to be substantially equal to the second DC voltage level while it outputs and supplies DC power stored in the battery to the output side of the DC/DC converter 7. The DC/DC converter 8 controls the DC output voltage level of the DC/DC converter 8 to be a DC voltage level to be used by the load 5 while it outputs and supplies DC power given from the DC/DC converter 7 or from the DC converter 3 to the load 5. Incidentally, it is a matter of course that each of the AC/DC converter 1, the DC/DC converter 7, the DC converter 3 and the portion of combination of the charger 6 and the battery 4 may be provided as a multiplex structure as shown in FIG. 4 or 5. Further, power supply configuration may be made so that the portion of combination of the charger 6 and the battery 4 is provided outside the power supply. In the embodiment of FIG. 6, the input voltage level of the DC/DC converter 8 can be made lower than the first DC voltage level, so that maintenance and exchange of the multiplex DC/DC converter 8 can be made more safely.

Figure 7:
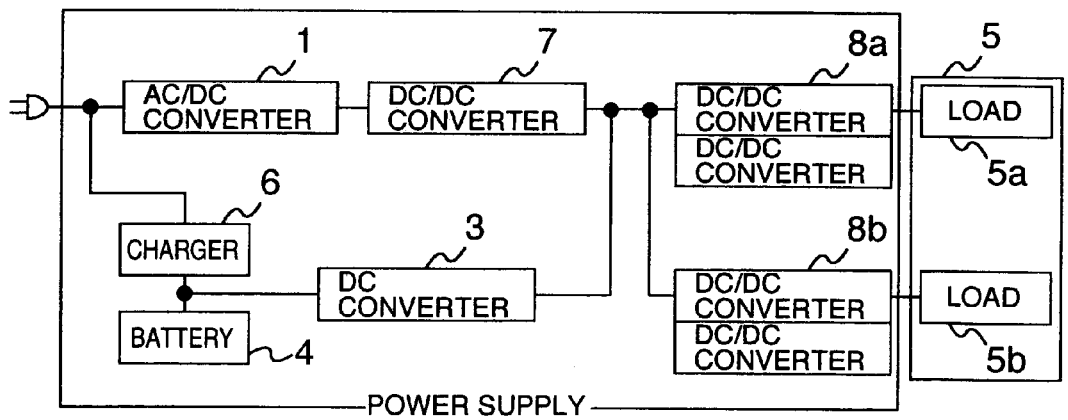
FIG. 7 shows a sixth embodiment of the present invention.

FIG. 7 shows a power supply according to a sixth embodiment of the present invention. In FIG. 7, circuit constituent parts such as converters, or the like, designated by the same reference numerals as used in FIG. 6 are the same as shown in FIG. 6. FIG. 7 shows the case where the plurality of unit DC/DC converters constituting the DC/DC converter 8 shown in FIG. 6 are divided into a plurality of groups (unit DC/DC converter groups) 8a and 8b. Each of the DC/DC converter groups 8a and 8b has a DC input and a DC output which are common to the plurality of unit DC/DC converters belonging to the group. The respective common DC inputs of the unit DC/DC converter groups 8a and 8b are connected to the DC output of the DC/DC converter 7. The common DC outputs of the unit DC/DC converter groups 8a and 8b are connected to loads 5a and 5b, respectively. The loads 5a and 5b are independent load portions constituting the load 5. In each of the unit DC/DC converter groups 8a and 8b in the embodiment of FIG. 7, a plurality of unit DC/DC converters are arranged in parallel with one another so as to be multiplexed. Hence, even in case where any one of the unit DC/DC converters breaks down with respect to any one of the loads 5a and 5b, power supply to the load can be continued by the other unit DC/DC converter. Accordingly, a power supply of high reliability for supplying electric power to a plurality of loads can be achieved.

Figure 8:
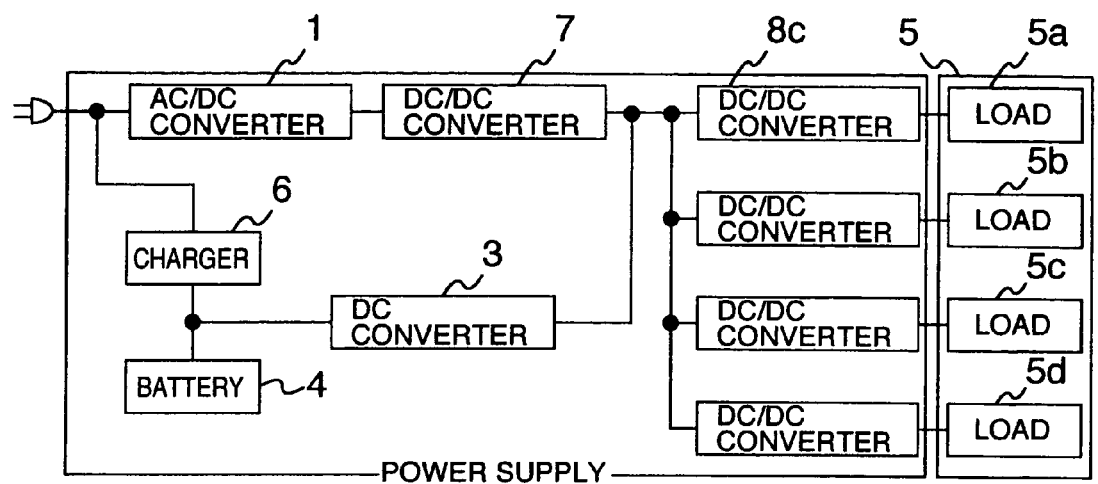
FIG. 8 shows a seventh embodiment of the present invention.

FIG. 8 shows a power supply according to a seventh embodiment of the present invention. In FIG. 8, circuit constituent parts such as converters, or the like, designated by the same reference numerals as shown in FIG. 6 are the same as shown in FIG. 6. In the embodiment of FIG. 8, a plurality of unit DC/DC converters 8a, 8b, 8c and 8d are provided as the DC/DC converter 8 shown in FIG. 6. Respective DC inputs of the unit DC/DC converters 8a, 8b, 8c and 8d are connected to the DC output of the DC/DC converter 7. DC outputs of the unit DC/DC converters 8a, 8b, 8c and 8d are connected to independent load portions 5a, 5b, 5c and 5d respectively. The independent load portions constitute the load 5. In this embodiment, respective output voltage and power levels of the unit DC/DC converters 8a–8d can be adjusted independently in accordance with the load portions. Accordingly, a power supply of high reliability permitting electric power to be supplied to a plurality of loads different in power consumption and in applied voltage level can be achieved.

Incidentally, the description of each of the second, third, fourth, fifth, sixth and seventh embodiments shows the case where the DC converter 3 has a single function of unidirectional power conversion from the battery side to the DC/DC converter side. As the DC converter 3, however, a converter permitting two-way power transmission may be used so that battery charging can be performed by the combination of the DC converter and the charger. Particularly, in the embodiment of FIG. 6, there may be provided a power supply which uses a DC converter permitting two-way power transmission as the DC converter so that the battery 4 is charged with DC power obtained from the front DC/DC converter 7 when the AC input is normal whereas a DC voltage from the battery 4 is supplied to the post-stage DC/DC converter 8 when the AC input is interrupted. In addition, the number of parallel arrangements of each circuit constituent part and the number of load portions are not limited to the numbers shown in the drawings and may be determined at option.

According to the present invention, a power supply of high reliability for supplying DC power to a load can be achieved.

What is claimed is:

1. A power supply comprising:
    an AC/DC converter which converts an input AC power into DC power and outputs the DC power to an output terminal thereof, said AC/DC converter having power factor improvement function;
    a DC/DC converter having an input terminal connected to the output terminal of said AC/DC converter, said DC/DC converter converting a DC voltage inputted thereto into a voltage value to be applied to a load;
    a DC converter having a first terminal connected to the output terminal of said AC/DC converter and the input terminal of said DC/DC converter; and
    DC power storage means which is connected to a second terminal of said DC converters, and which supplies said DC/DC converter with a DC power through said DC converter;
    wherein said load is supplied with the DC power from said AC/DC converter through said DC/DC converter, and said DC power storage means connected to said second terminal of said DC converter is supplied with the DC power from said AC/DC converter for charging using a path through the output terminal of said AC/DC converter, the first terminal of said DC converter and said DC converter; and
    wherein, said DC converter comprising an actuating signal generating portion having an AND logic circuit, and said AND logic circuit is supplied with a power interruption detecting signal and an actuating command, and
    when the input AC power is not applied to said AC/DC converter and said actuating command is ON, said load is supplied with the DC power from said DC power storage means using a path through said second terminal, said DC converter, said first terminal and said DC/DC converter in order.

2. A power supply according to claim 1, wherein said DC converter comprises:
    a first converter having an AC terminal, and a DC terminal which is said first terminal connected to the input terminal of said DC/DC converter;
    a transformer having a high-voltage side winding connected to the AC terminal of said first converter, and a low-voltage side winding; and
    a second converter having an AC terminal connected to the low-voltage side winding, and a DC terminal which is said second terminal connected to said DC power storage means.

3. A power supply according to claim 1, wherein said DC power storage means is a secondary battery or a capacitor.

4. A power supply according to claim 1, wherein said AC/DC converter is supplied with commercial AC power of 100 V to 200 V.

5. A power supply according to claim 1, wherein said DC power storage means voltage is 40 V to 50 V.

6. A power supply comprising:
    an AC/DC converter which converts an input AC power into DC power and outputs the DC power to an output terminal thereof;
    a DC/DC converter having an input terminal connected to the output terminal of said AC/DC converter, said DC/DC converter converting a DC voltage inputted thereto into a voltage to be applied to a load;
    a DC converter having a first terminal connected to the output terminal of said AC/DC converter and the input terminal of said DC/DC converter; and
    a DC power storage unit which is connected to a second terminal of said DC converter to receive storage power, and which supplies said DC/DC converter with a DC power through said DC converter;
    wherein said load is supplied with the DC power from said AC/DC converter through said DC/DC converter, and said DC power storage unit connected to said second terminal of said DC converter is supplied with the DC power from said AC/DC converter for charging using a path through the output terminal of said AC/DC converter, the first terminal of said DC converter and said DC converter; and
    wherein, said DC converter comprising a back-up power actuating unit including an AND logic circuit, and where differing inputs of the AND logic circuit are supplied with a power interruption detecting signal and a back-up power actuating command signal, and when both the power interruption detecting signal indicates that input AC power is not applied to said AC/DC converter and the actuating command signal enables back-up power, said load is supplied with the DC power from said DC power storage unit using a path through said second terminal, said DC converter, said first terminal and said DC/DC converter.

7. A power supply according to claim 6, wherein said DC converter comprises:
    a first converter having an AC terminal, and a DC terminal which is said first terminal connected to the input terminal of said DC/DC converter;
    a transformer having a high-voltage side winding connected to the AC terminal of said first converter, and a low-voltage side winding; and
    a second converter having an AC terminal connected to the low-voltage side winding, and a DC terminal which is said second terminal connected to said DC power storage unit.

8. A power supply according to claim 6, wherein said DC power storage unit is a secondary battery or a capacitor.

9. A power supply according to claim 6, wherein said AC/DC converter is supplied with commercial AC power of 100 V to 200 V.

10. A power supply according to claim 6, wherein said DC power storage unit voltage is 40 V to 50 V.

* * * * *